(12) United States Patent
Huntsberger et al.

(10) Patent No.: US 6,408,967 B1
(45) Date of Patent: Jun. 25, 2002

(54) BUBBLE-PRODUCING RIDE-ON VEHICLE (75) Inventors: Kurt J. Huntsberger, Chaffee; John L. Jones, Jr., East Aurora, both of NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 09/629,554

(22) Filed: Jul. 31, 2000

Related U.S. Application Data (63) Continuation-in-part of application No. 09/499,585, filed on Feb. 7, 2000.
(51) Int. Cl.[7] .............................. B60K 1/00; B05B 9/00
(52) U.S. Cl. .................... 180/65.1; 180/53.1; 180/53.6; 239/156; 239/289; 446/15; 446/16; 446/17; 446/18; 446/409; 446/440
(58) Field of Search ............................ 180/65.1, 53.1; 239/156, 289; 446/15, 16, 17, 18, 409, 440, 454

(56) References Cited

U.S. PATENT DOCUMENTS

| 2,579,714 A | 12/1951 | Treuthart |
| 2,675,641 A | 4/1954 | Baggott |
| 2,805,515 A | 9/1957 | Gans et al. |
| 3,002,314 A | 10/1961 | Brottman |
| 3,008,263 A | 11/1961 | Ellman |
| 3,093,925 A | 6/1963 | Greene |
| 3,228,136 A | 1/1966 | Rouse |
| 3,246,418 A | 4/1966 | Andersen et al. |
| 3,246,419 A | 4/1966 | Pawelka et al. |
| 3,708,909 A | 1/1972 | Winston |
| 3,665,637 A | 5/1972 | Starr |
| 3,738,051 A | 6/1973 | Wakeem |
| 3,775,899 A | 12/1973 | Wolf |
| 3,913,260 A | 10/1975 | Corbett |
| 4,016,673 A | 4/1977 | Constance |
| 4,062,143 A | 12/1977 | Lerman |
| 4,128,962 A | 12/1978 | Anderson |
| 4,184,284 A | 1/1980 | Rogahn |
| 4,367,608 A | 1/1983 | Melotti |

(List continued on next page.)

FOREIGN PATENT DOCUMENTS

| EP | 094 532 | 11/1983 | | |
| GB | 1188868 | 4/1970 | | |
| GB | 1476049 | 12/1975 | | |
| GB | 2186199 | * 8/1987 | .................. | 446/15 |
| GB | 2224950 | 5/1990 | | |
| GB | 2266061 | 10/1993 | | |
| JP | 08072562 | * 3/1996 | .................. | 464/15 |
| JP | 09192438 | * 7/1997 | .................. | 446/15 |

OTHER PUBLICATIONS

Toys–R–Us advertisement, 1985.
Fisher–Price Catalog, p. 58, 1987.

Primary Examiner—Paul N. Dickson
Assistant Examiner—Toan To
(74) Attorney, Agent, or Firm—Kolisch, Hartwell, Dickinson, McCormack & Heuser, PC (57) ABSTRACT A children's ride-on vehicle that resembles a riding lawn-mower or tractor. The vehicle includes a drive assembly with a battery-powered motor, and a frame that is adapted to support a child. The ride-on further includes a bubble-producing mechanism adapted to produce a stream of bubbles.

29 Claims, 9 Drawing Sheets

U.S. PATENT DOCUMENTS

| | | |
|---|---|---|
| 4,447,982 A | 5/1984 | Gushea |
| 4,556,392 A | 12/1985 | Chang |
| 4,560,022 A | 12/1985 | Kassai |
| 4,576,582 A | 3/1986 | Panzarella |
| 4,700,965 A | 10/1987 | Kinberg |
| 4,764,141 A * | 8/1988 | D'Andrade ................ 446/15 |
| D300,619 S | 4/1989 | Phinney et al. |
| RE32,973 E | 7/1989 | Panzarella |
| 5,078,636 A | 1/1992 | Clarke et al. |
| 5,135,422 A * | 8/1992 | Bowen ................ 446/15 |
| 5,269,715 A | 12/1993 | Silveria et al. |
| 5,348,507 A | 9/1994 | McGhie et al. |
| 5,366,402 A | 11/1994 | Rudell et al. |
| 5,395,274 A | 3/1995 | Myers |
| 5,439,071 A | 8/1995 | Rodriguez-Ferre |
| 5,462,469 A | 10/1995 | Lei |
| 5,495,876 A | 3/1996 | Schramm |
| 5,603,651 A | 2/1997 | Shure et al. |
| 5,620,351 A | 4/1997 | Ho |
| 5,643,035 A | 7/1997 | Freese et al. |
| 5,746,636 A | 5/1998 | Cernansky et al. |
| 5,842,899 A | 12/1998 | Cernansky et al. |
| 5,845,724 A | 12/1998 | Barrett |
| 5,908,057 A | 6/1999 | Schramm |
| 6,024,623 A | 2/2000 | Menow et al. |

* cited by examiner

BUBBLE-PRODUCING RIDE-ON VEHICLE

RELATED APPLICATION

This application is a continuation-in-part of and claims priority to co-pending U.S. patent application Ser. No. 09/499,585, which was filed on Feb. 7, 2000, is entitled "Bubble-Producing Ride-On Vehicle," and the complete disclosure of which is hereby incorporated by reference.

FIELD OF THE INVENTION

The invention relates generally to children's ride-on vehicles, and more particularly to a bubble-producing children's ride-on vehicle.

BACKGROUND AND SUMMARY OF THE INVENTION

Ride-on vehicles for children have become increasingly popular due in part to the desire of children to drive self-propelled vehicles resembling full-size vehicles. Such ride-on vehicles, or ride-ons, are typically propelled by batterypowered motors and generally include scaled-down features of full-size vehicles, such as cars and trucks. These vehicles enable a child to steer and otherwise drive a vehicle, simulating an adult driving a full-size vehicle. However, a child's desire to emulate the actions of his or her parents or older siblings extends to other activities other than driving an automobile. Reduced-scale ride-on vehicles that simulate other full-size vehicles would enable children to further imitate the actions of their parents, however, these vehicles must be adapted to be safe and also entertaining for children.

The invented ride-on includes a drive assembly with a battery-powered motor, and a frame that is adapted to support a child and resemble a full-size riding lawnmower or tractor. The ride-on further includes a bubble-producing mechanism adapted to produce a stream of bubbles, such as to simulate the stream of clippings discharged by a full-size mower or tractor.

Many other features of the present invention will become manifest to those versed in the art upon making reference to the detailed description which follows and the accompanying sheets of drawings in which preferred embodiments incorporating the principles of this invention are disclosed as illustrative examples only.

DETAILED DESCRIPTION OF THE PREFERRED EMBODIMENTS AND BEST MODE OF THE INVENTION

Figure 1:
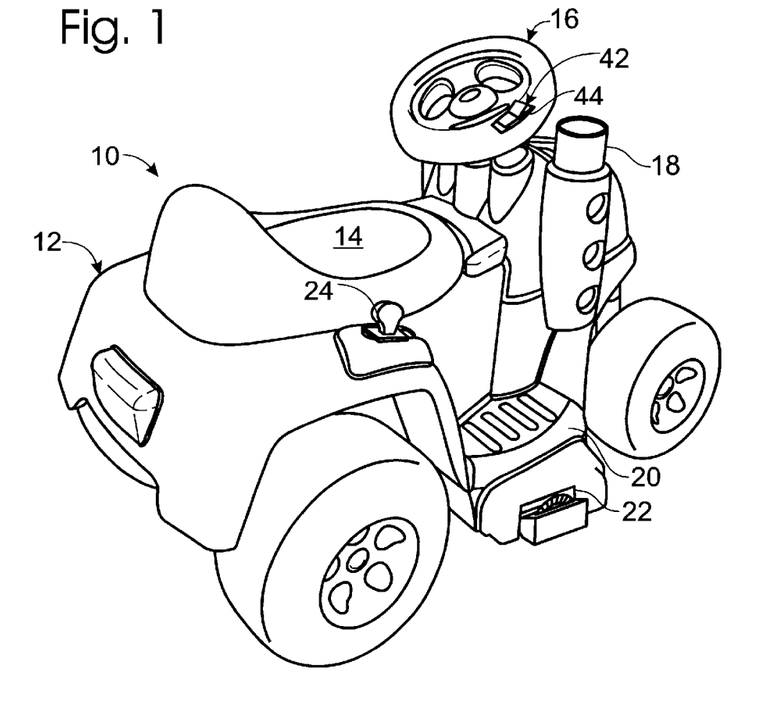
FIG. 1 is a rear perspective view showing a children's ride-on vehicle according to the present invention.
Figure 2:
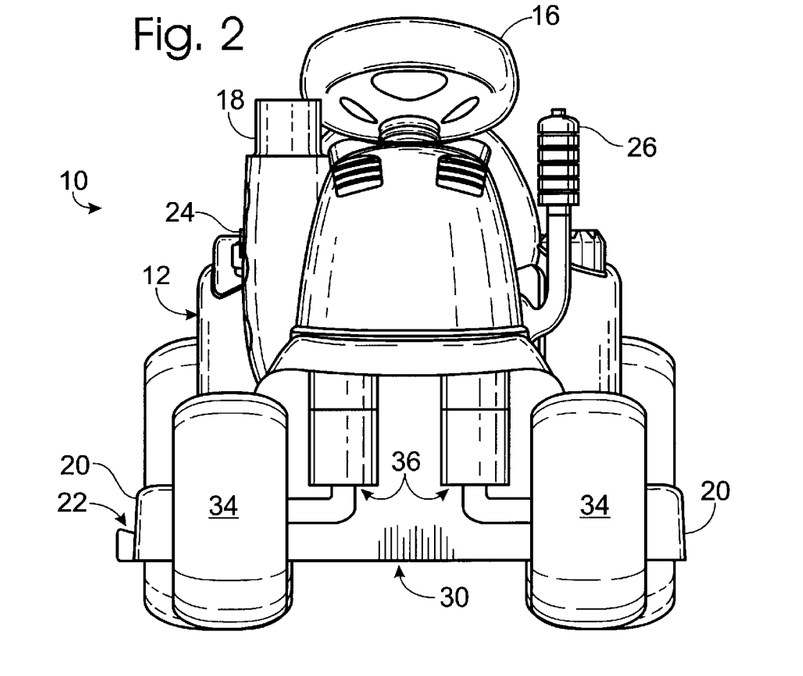
FIG. 2 is a front elevation view of the vehicle of FIG. 1.
Figure 3:
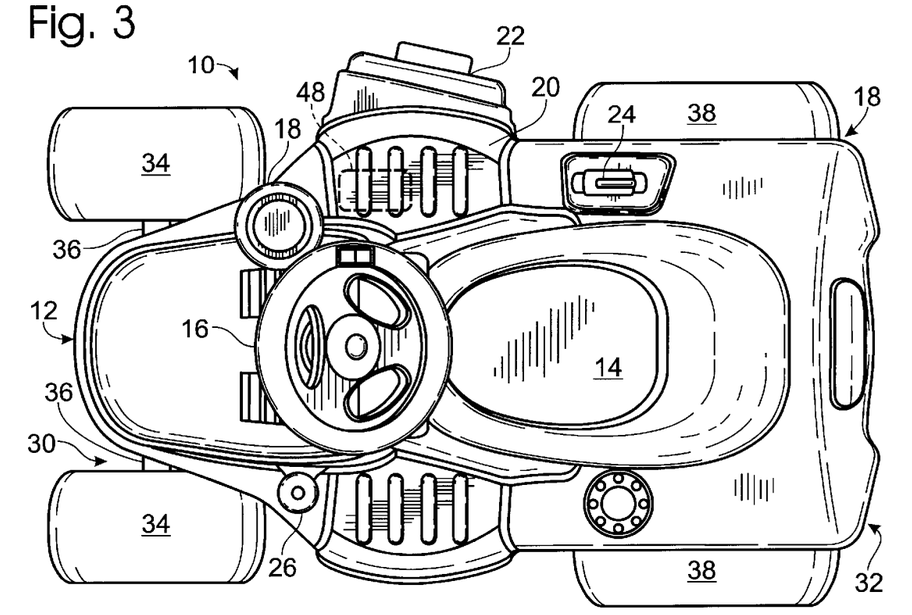
FIG. 3 is a top plan view of the vehicle of FIG. 1.

A children's ride-on vehicle, or ride-on, constructed according to the present invention is shown in FIGS. 1–3 and generally indicated at 10. As shown, vehicle 10 generally resembles a reduced-scale riding lawnmower or tractor. Ride-on 10 includes a frame, or vehicle body, 12. Frame 12 typically is formed from molded plastic parts that are secured together by screws or other suitable fasteners. As shown in FIGS. 1–3, frame 12 is shaped to resemble components of a conventional riding lawnmower, including a seat 14, a steering mechanism including a steering wheel 16, an exhaust pipe 18, a mower deck 20 with a "grass" discharge port 22, a shifter 24, and a pivotal "deck adjustment" arm 26, which is shown in FIGS. 2 and 3.

Ride-on 10 further includes front and rear wheel-and-axle assemblies 30 and 32. Each assembly 30 and 32 includes at least one wheel and an axle or other suitable mechanism for rotatably coupling the wheels to the vehicle. For example, as shown in FIG. 2, front assembly 30 includes front wheels 34 that are each rotatably mounted on spindle mounts 36. Wheels 34 may also be referred to as steerable wheels because assembly 30 is coupled to the vehicle's steering mechanism, and front wheels 34 are thereby steered responsive to a child sitting on seat 14 turning steering wheel 16. It should be understood that the steering mechanism may include a handlebar in place of wheel 16, for example, depending upon the particular type of full-sized vehicle ride-on 10 is meant to simulate.

Figure 5:
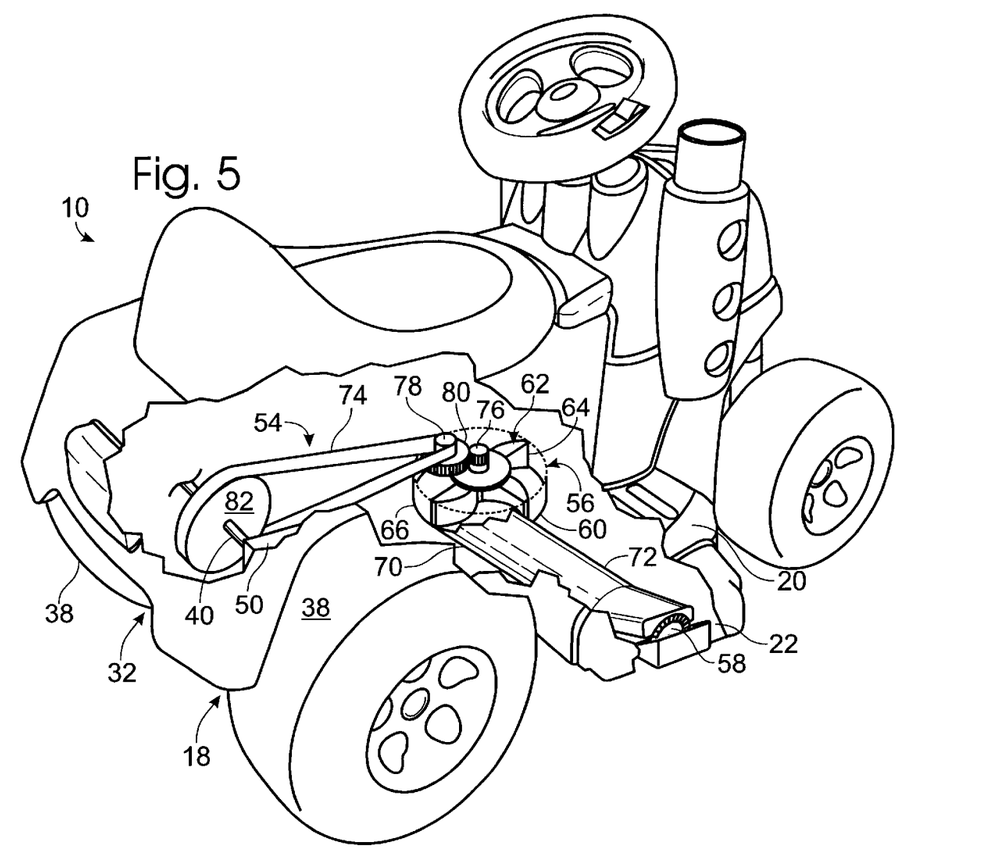
FIG. 5 is a fragmentary rear perspective view showing an embodiment of the bubble-producing mechanism and wheel-and-axle assembly of FIG. 4 implemented on the vehicle of FIG. 1.

Rear assembly 32 includes rear wheels 38, which are rotatably mounted on an axle 40, which is shown in FIG. 5. Rear wheels 38 may also be referred to as driven wheels because axle 40 is rotatably driven by the vehicle's motor assembly, and rear wheels 38 are thereby driven responsive to a user manipulable switch assembly 42. Examples of suitable switch assemblies include, for example, an on/off switch 44 (shown in FIGS. 1 and 3), a foot pedal 46 (shown in dashed lines in FIG. 3), or any other suitable mechanism for enabling a user to selectively actuate the ride-on's motor assembly.

Figure 4:
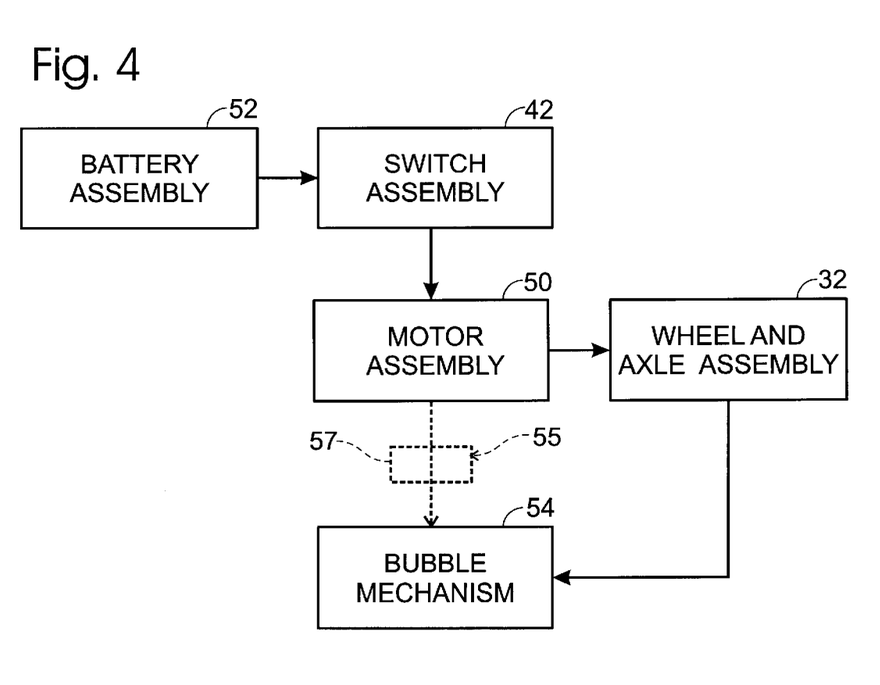
FIG. 4 is a schematic diagram showing the bubble-producing mechanism and motor and drive assemblies of the vehicle of FIG. 1.

In FIG. 4, the drive components of vehicle 10 are schematically illustrated. As shown, the vehicle includes an electrically powered motor assembly 50, and a battery assembly 52 adapted to selectively provide power to the motor assembly responsive to user-inputs conveyed through switch assembly 42. Motor and battery assemblies each may include one or more motors or batteries, respectively. It should be understood that motor assembly 50 may also include one or more gears to adjust the speed at which axle 40 is rotated relative to the portion of motor assembly 50 that drives the axle. Battery assembly 52 typically is housed in a user-accessible portion of frame 12 so that the batteries forming battery assembly 52 may be removed and replaced as needed. For example, seat 14 may be removably coupled to the frame to allow access to the batteries.

In addition to the structure described above, switch assembly 42 may include a reversing switch to enable the vehicle to be driven in reverse, and one or more shift levers or throttles to allow the user to selectively regulate the speed at which vehicle 10 travels. An example of a suitable shift mechanism is shown in U.S. Pat. No. 5,644,114 to Neaves, and an example of a suitable foot pedal is shown in U.S. Pat. No. 5,319,996 to Harris. The disclosures of U.S. Pat. Nos. 5,644,114 and 5,319,996 are hereby incorporated by reference.

Also schematically illustrated in FIG. 4 is a bubble mechanism 54 that is adapted to produce and emit through discharge port 22 a stream of soap bubbles, such as to simulate the stream of clippings that would be emitted through the discharge port of a full-size riding lawnmower. As indicated with arrows in FIG. 4, bubble mechanism 54 may be driven by motor assembly 50 either directly, or via one of the vehicle's wheel-and-axle assemblies, such as assembly 32.

As also shown in FIG. 4 in dashed lines, vehicle 10 may include a switch assembly 55 that allows the bubble mechanism to be selectively disengaged from operation when the vehicle is driven. In the embodiment shown in FIG. 4 where the bubble mechanism is driven by motor assembly 50, switch assembly 55 will typically take the form of a mechanical linkage that is positionable between an actuated position, in which the motor assembly drives the bubble mechanism, and an unactuated position, in which the bubble mechanism is not driven by the motor assembly. The linkage is positioned by the user via a suitable user-manipulable element 57, such as switch, lever, button, slide or the like.

In FIG. 5, an example of bubble mechanism 54 is shown. Mechanism 54 includes a fan assembly 56 that produces an air stream, which produces, or "blows" bubbles from a rotatable bubble wheel 58. Fan assembly 56 includes a housing 60 in which a fan 62 with plural vanes 64 is rotatably mounted. Housing 60 includes an input 66, such as one or more vents 68 (shown in FIG. 6), through which air is drawn into the fan assembly, and an output 70 through which air is delivered to the bubble wheel. As shown, output 70 includes an elongate passage 72 through which the produced air stream flows.

Fan assembly 56 is rotatably driven by a pulley 74 that is coupled between axle 40 and a pinion 76 on the axle of the fan. In FIG. 5, pulley 74 extends around a pinion 78 on a rotatable gear 80 with teeth that engage the corresponding teeth on pinion 76. Also shown in FIG. 5 is a spacing disc 82 around which the pulley extends on axle 40. It should be understood that the relative speed of rotation of fan 62 compared to axle 40 may be adjusted by varying the size of disc 82 or any of the gears and pinions discussed above.

Figure 6:
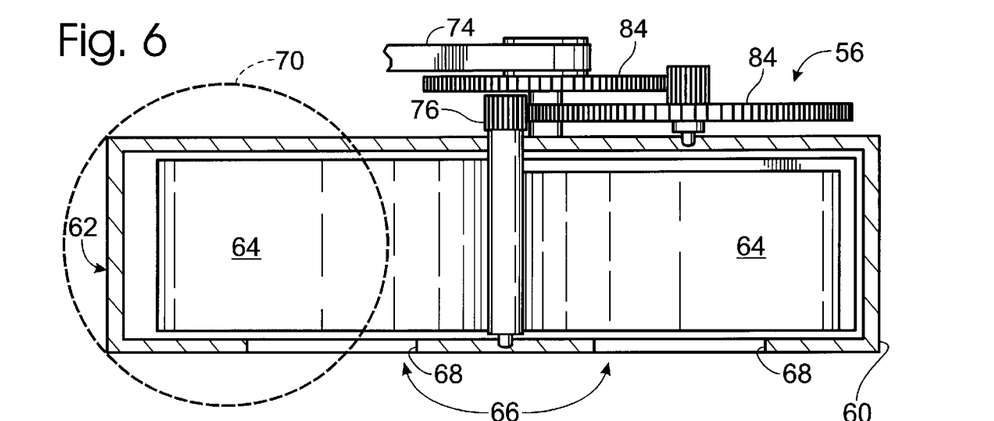
FIG. 6 is an enlarged cross-sectional detail showing another embodiment of the bubble-producing mechanism of FIG. 5.

In some embodiments, it may be desirable to use plural gears to couple the pulley to fan 62, such as shown in FIG. 6. For example, a pair of interconnected gears 84 are shown in FIG. 6. Plural gears may also be used to control the direction of rotation of the fan relative to the drive axle. For example, if the front axle assembly included the driven axle, the fan assembly shown in FIG. 6 could be used to drive fan 62 in the direction to produce the required airflow. It should be understood that the location of output 70 and the configuration of fan 62 and vanes 64 may vary, and that the gearing used to couple the pulley thereto should be selected to produce the desired direction and speed of rotation.

Figure 7:
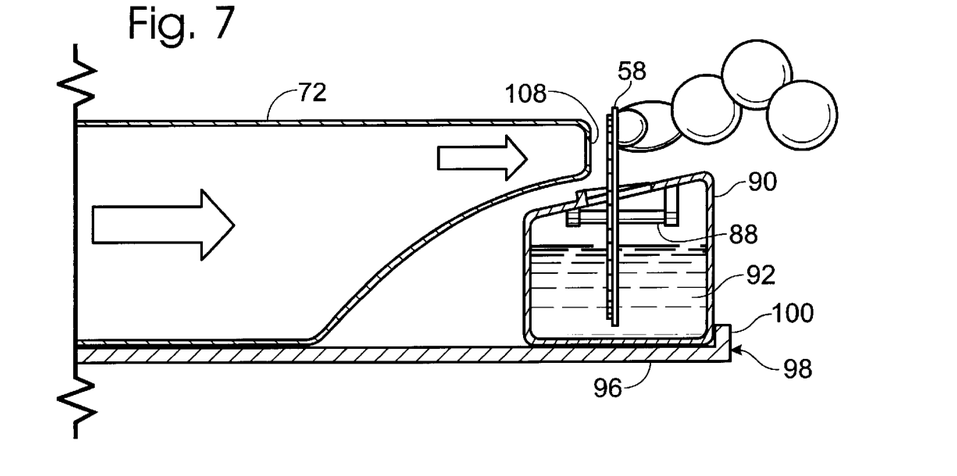
FIG. 7 is an enlarged cross-sectional detail showing the discharge portion of the bubble-producing mechanism of FIG. 5 showing a retainer for preventing unintentional removal of the bubble tray.
Figure 8:
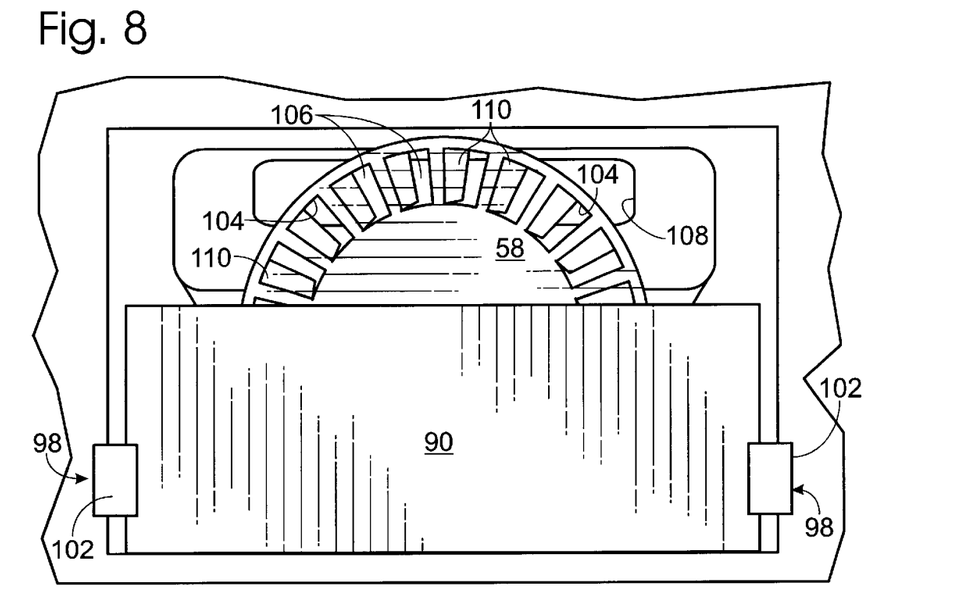
FIG. 8 is a side elevation view of the discharge portion of the bubble-producing mechanism of FIG. 5 and showing another retainer for preventing unintentional removal of the bubble tray.

In FIG. 7, bubble wheel 58 is shown in more detail. As shown, wheel 58 is rotatably mounted on an axle 88. The lower portion of the wheel extends within a bubble tray 90, which is adapted to receive bubble solution 92. Examples of suitable bubble solutions are soapy water and any suitable commercially available liquid for blowing bubbles. Tray 90 is charged with a volume of bubble solution 92 through an opening 94. Preferably, tray 90 is removable for cleaning. As shown in FIG. 7, the tray is supported on a mount, or platform, 96 that includes a retainer 98 in the form of a lip 100 that prevents unintentional removal of the tray, such as when the vehicle travels over uneven ground. In FIG. 8, another example of a suitable retainer 98 is shown, namely, deformable clips 102 that selectively couple the tray to a portion of vehicle 10.

Figure 9:
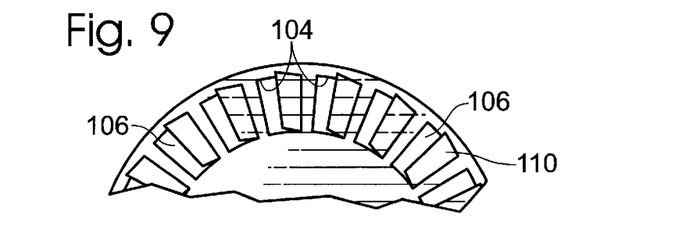
FIG. 9 is a fragmentary detail showing a portion of the bubble wheel of FIG. 8.

As perhaps best seen in FIGS. 8 and 9, bubble wheel 58 includes a plurality of apertures 104 through which air may be blown to produce bubbles. As the bubble wheel is rotated about its axle, a film 106 of bubble solution forms across the apertures as the apertures are drawn out of the bubble solution. As the wheel is further rotated, the airflow exhausted through an outlet 108 of air passage 72 passes through the film-covered apertures to produce bubbles. In the embodiment of bubble wheel 58 shown in FIGS. 7 and 8, the airflow also causes rotation of the wheel because the wheel includes a plurality of inclined vanes 110, much like on a windmill.

It should be understood that it is within the scope of the invention that the bubble wheel may be rotated by any suitable mechanism. Similarly, the size of outlet 108 may vary, depending upon such factors as the volume and flow rate of air through passage 72, whether bubble wheel 58 is air-propelled or mechanically propelled, and the size and configuration of the bubble wheel being used. Outlet 108 may also include more than a single orifice, and instead may include a plurality of discrete orifices. For example, a smaller orifice may be used to produce a stronger stream of air, such as to propel the wheel, while a larger orifice may be used to blow bubbles.

It should be understood that the size, number and shape of the vanes and apertures may vary, and that the vanes and apertures may be separately located on the wheel. For example, the apertures may take the form of circular bubble holes, such as used on conventional bubble wands sold with commercially available bottles of bubble solution, and the vanes may extend rearward from any suitable location on the bubble wheel.

It should be understood that fan assembly 56 may be coupled to the frame of the vehicle in any suitable location.

For example, it may be housed within the body of the vehicle. Alternatively, it may be mounted to the underside of the vehicle. Similarly, the bubble mechanism may be positioned to produce bubbles from other locations on the vehicle. For example, bubbles could be emitted from exhaust pipe 18 to simulate exhaust therefrom.

Figure 10:
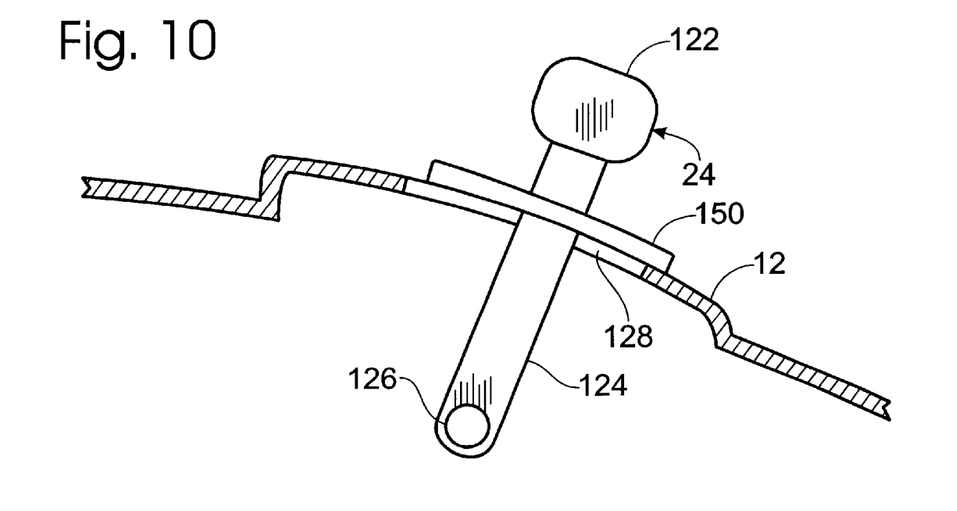
FIG. 10 is an enlarged partial cross-sectional detail showing a portion of the vehicle's body adapted to receive a bubble wand.

In addition to producing a stream of bubbles to simulate clippings exhausted from a full-size riding lawnmower, ride-on 10 also includes receivers adapted to house a bubble wand and a container of bubble solution so that a child seated on the vehicle may manually produce bubbles. As shown in FIG. 10, the shifter, or shift lever, 24 shown in FIG. 1 is actually a bubble wand. Wand/shifter 24 includes a user-grippable handle 122 from which an elongate stem 124 extends. Stem 124 includes one or more openings 126 through which a film of bubble solution may form when the stem is dipped into and removed from a container of bubble solution. As shown, body 12 of the ride-on includes an elongate slot 128 through which at least a portion of stem 124 is slidably and removably received within. The slot enables a child sitting on seat 14 to slide the "shifter" forward and backward within the slot to simulate shifting of the "lawnmower's" gears. When the child wants to manually blow bubbles, the "shifter" is removed from the slot and used like a conventional bubble wand.

Figure 12:
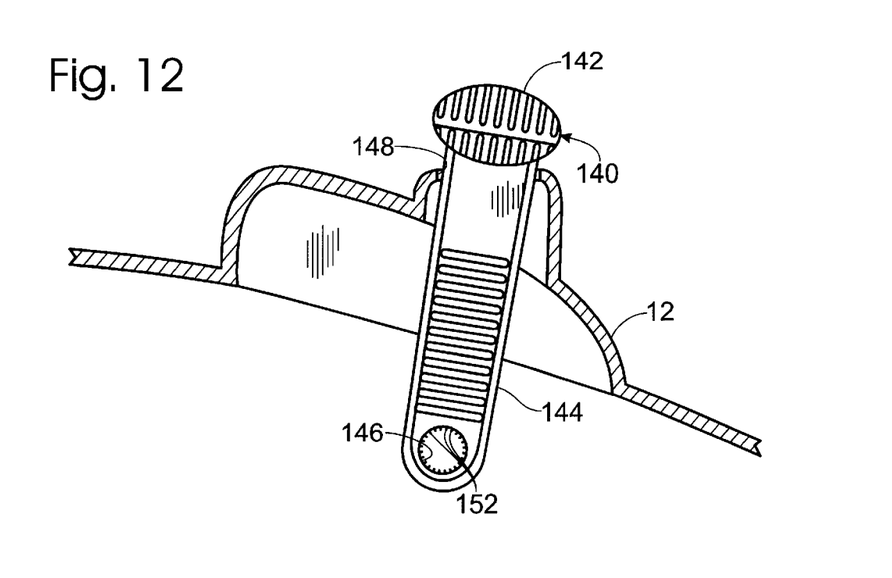
FIG. 12 is an enlarged partial cross-sectional detail showing a portion of the vehicle's body adapted to receive another version of a bubble wand.

Another suitable bubble wand is shown in FIG. 12 and generally indicated at 140. Similar to wand 24, wand 140 includes a user-grippable handle 142, a stem 144 that extends from handle 142, and one or more openings 146 through which a film of bubble solution may form when the stem is dipped into and removed from a container of bubble solution. As shown, body 12 of the ride-on includes a slot 148 that has a cross-sectional area that is sized to generally correspond to the cross-sectional area of stem 144. Unlike the elongate slot shown in FIG. 10, slot 148 is sized to retain wand 140 in a generally defined position.

It should be understood that slot 148 should be sufficiently larger in cross-sectional area than stem 144 so that precise positioning of the wand is not required to insert the stem into the slot. However, slot 148 should not be so large as to permit the handle of the wand to pass therethrough. Similar to wand 24, wand 140 may include a collar 150 that prevents the handle from passing through the slot even if the handle does not have a cross-sectional area that is larger than the area of the slot. In FIG. 12, it can be seen that opening 146 includes a plurality of flutes 152 that retain bubble solution therebetween so that a greater volume of bubble solution may be retained on the wand when the wand is drawn from a container of bubble solution.

Figure 11:
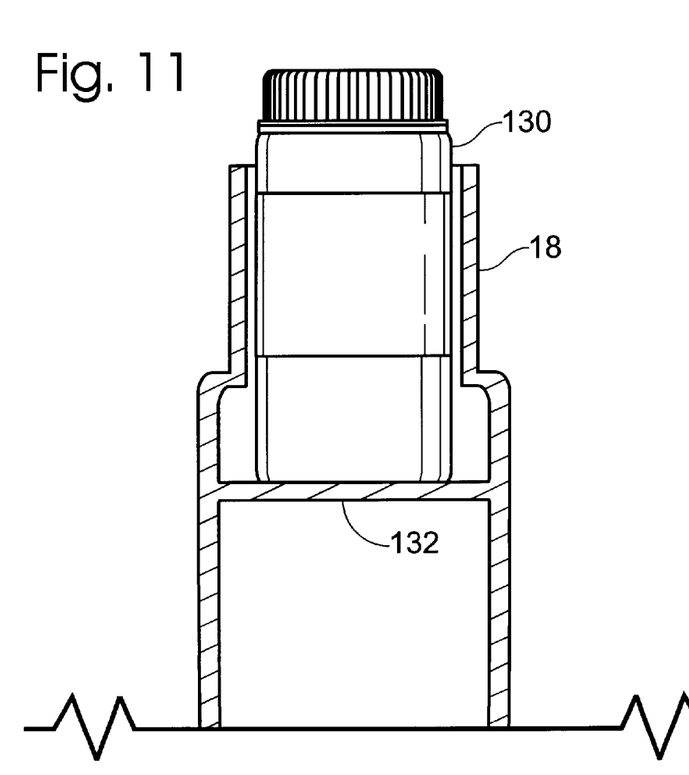
FIG. 11 is an enlarged partial cross-sectional detail showing a portion of the vehicle's housing adapted to receive a bubble container.

Ride-on 10 also includes a receiver for a container of bubble solution. As shown in FIG. 11, "exhaust pipe" portion 18 of body 12 is sized to support a container 130 of bubble solution. Portion 18 includes a support 132 internal the "exhaust pipe" that is positioned to support the container of bubble solution and present the opening of the container at a location where it can be easily reached by a child sitting on seat 14. It should be understood that ride-on 10 may be formed without the bubble wand/shifter and container-supporting exhaust pipe discussed above.

Figure 13:
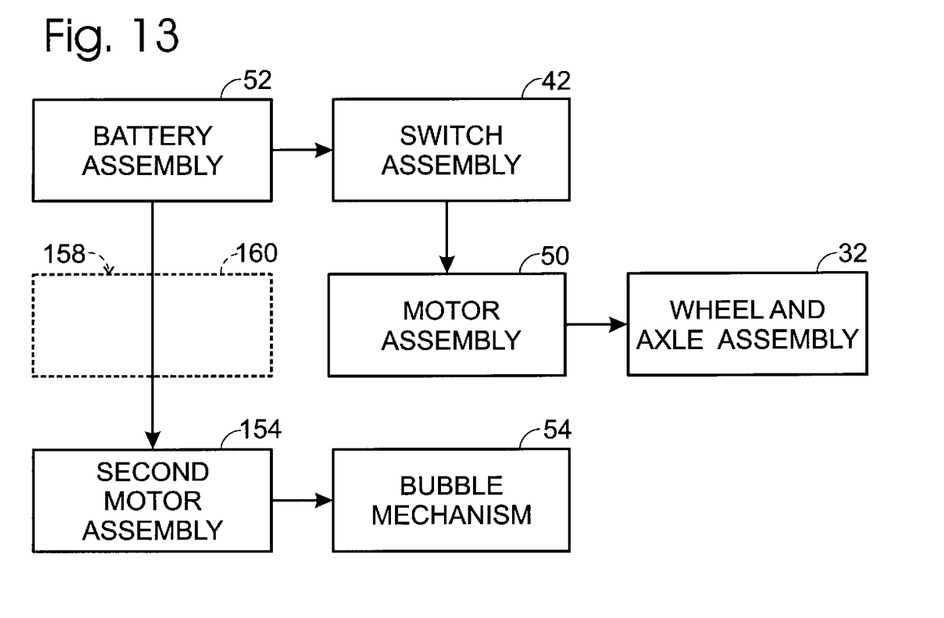
FIG. 13 is a schematic diagram showing another version of the bubble-producing mechanism and motor and drive assemblies of the vehicle of FIG. 1.
Figure 14:
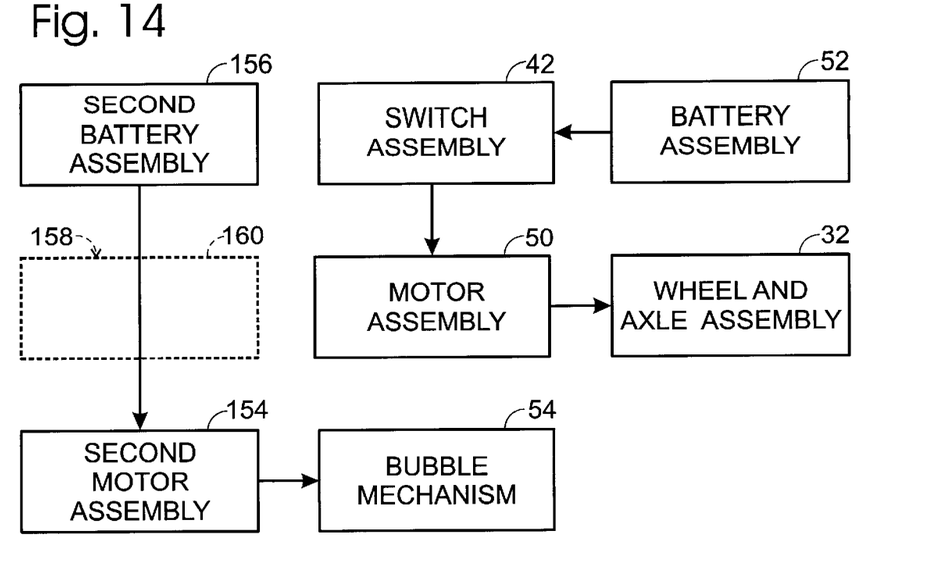
FIG. 14 is a schematic diagram showing another version of the bubble-producing mechanism and motor and drive assemblies of the vehicle of FIG. 1.

In FIG. 4, it was discussed that bubble mechanism 54 may be powered by the vehicle's motor assembly 50, either directly or via the vehicle wheel and axle assembly 32. Alternatively, the bubble mechanism may include its own motor assembly that is powered by a battery assembly that is the same as or independent from battery assembly 52. An example of such a configuration is schematically illustrated in FIGS. 13 and 14. In FIG. 13, the previously discussed battery assembly 52 provides power to a second motor assembly 154 that is adapted to drive bubble mechanism 54 and which includes one or more motors. In FIG. 14, the vehicle includes a second battery assembly 156 that includes one or more batteries adapted to power second motor assembly 154. Any suitable configuration of wiring harness may be used to electrically interconnect switches, actuators, battery assemblies and motor assemblies discussed herein.

In FIGS. 13 and 14, a switch assembly 158 is shown in dashed lines to signify that either configuration may, but does not necessarily, include a suitable mechanism to allow a user to selectively disable the bubble mechanism. In the embodiments shown, switch assembly 158 will typically be an electrical switch that is positionable between an actuated position, in which the electrical circuit between the corresponding battery assembly and motor assembly is closed so that the bubble mechanism is driven, and an unactuated position, in which the circuit is open so that power is not provided to motor assembly 154 and the bubble mechanism is not driven.

It should be understood that switch assembly 158 may alternatively, or additionally, include a mechanical switch, such as discussed above with respect to switch assembly 55. Regardless of the particular structure of the switch assembly, the switch assembly should include a user manipulable element 160 that allows the user to select the desired position of the switch assembly. Examples of suitable elements 160 include one or more push buttons, levers, pedals, plug-and-socket assemblies, and the like.

Figure 15:
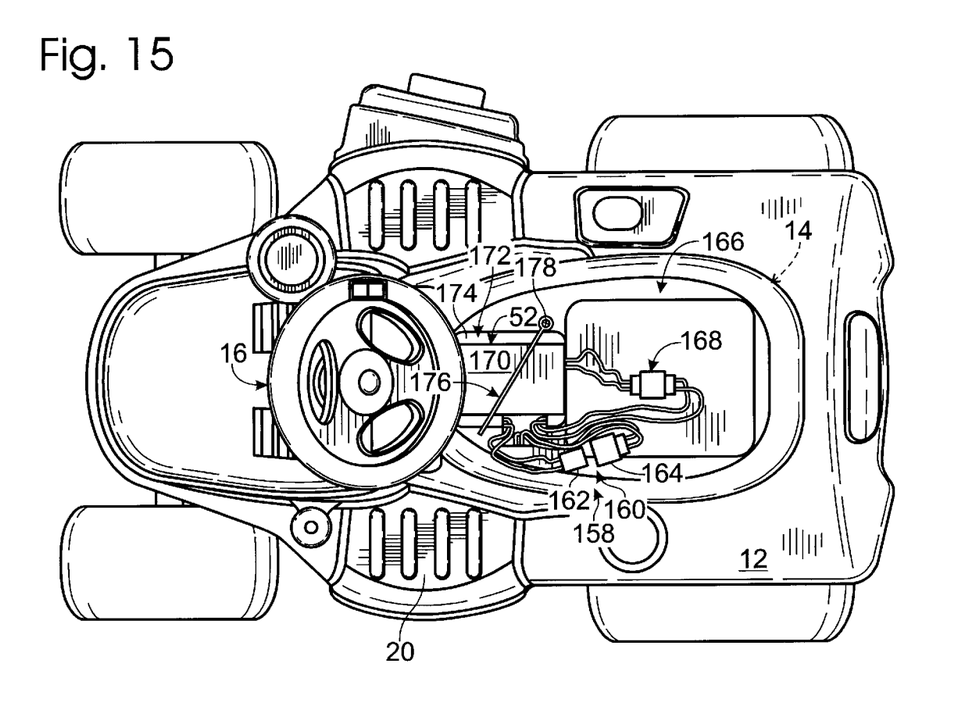
FIG. 15 is a rear isometric view of an embodiment of the vehicle of FIG. 1 with the seat removed.

In FIG. 15, an example of a suitable switch assembly 158 is shown. In FIG. 15, assembly 158 takes the form of a plug-and-socket assembly 160 that includes an electrical plug 162 and socket 164. When connected together, assembly 160 enables a complete electrical circuit between second motor assembly 154 and the corresponding battery assembly 52 or 156. When plug 162 and socket 164 are separated, however, power is not delivered to the second motor assembly and bubble mechanism 54 is therefore not driven. In FIG. 15, plug 162 and socket 164 are shown coupled together in a cavity 166 beneath the vehicle's seat 14. Any other suitable location may be used, such as beneath the vehicle's body 12 or external body 12.

If it is desired for a child to control the switch assembly while vehicle 10 is being used, switch assembly 158 should be located in a position where the child may easily reach the assembly while seated on seat 14. For example, assembly 158 may be located on steering wheel 16, or on body 12, such as beside or in front of seat 14. In these positions, switch assembly 158 will typically take the form of a two-position or similar switch or toggle. Alternatively, switch assembly 158 may take the form of a foot-activated pedal positioned on deck 20.

If it is desired for the switch assembly to only be controlled when the vehicle is not being ridden or driven, then assembly 158 will preferably be beneath seat 14 or body 12. In such a position, any suitable switch structure may be used. It is within the scope of the present invention that switch assemblies 55 and 158 may also include a switch or other suitable structure to allow a user to selectively control the rate of rotation of fan assembly 56 relative to the speed of rotation of the corresponding motor assembly.

Also shown in FIG. 15 is a plug-and-socket assembly 168 that selectively provides electrical communication between battery assembly 52 and motor assembly 50. As shown, battery assembly 52 includes a battery 170 that is seated in a battery-receiving region 172 of cavity 166. Region 172 is sized to receive battery 170 through an opening 174 and to support the battery to prevent the battery from being dislodged or moving beyond a defined boundary when the vehicle is used. Also shown in FIG. 15 is a battery retainer 176 that is removably positioned across opening 174 to prevent unintentional removal of battery 170 from region 172. As shown, removal of a screw or other suitable fastener 178 is required before retainer 176 may be moved from the position shown to permit battery 170 to be removed from region 172.

Figure 16:
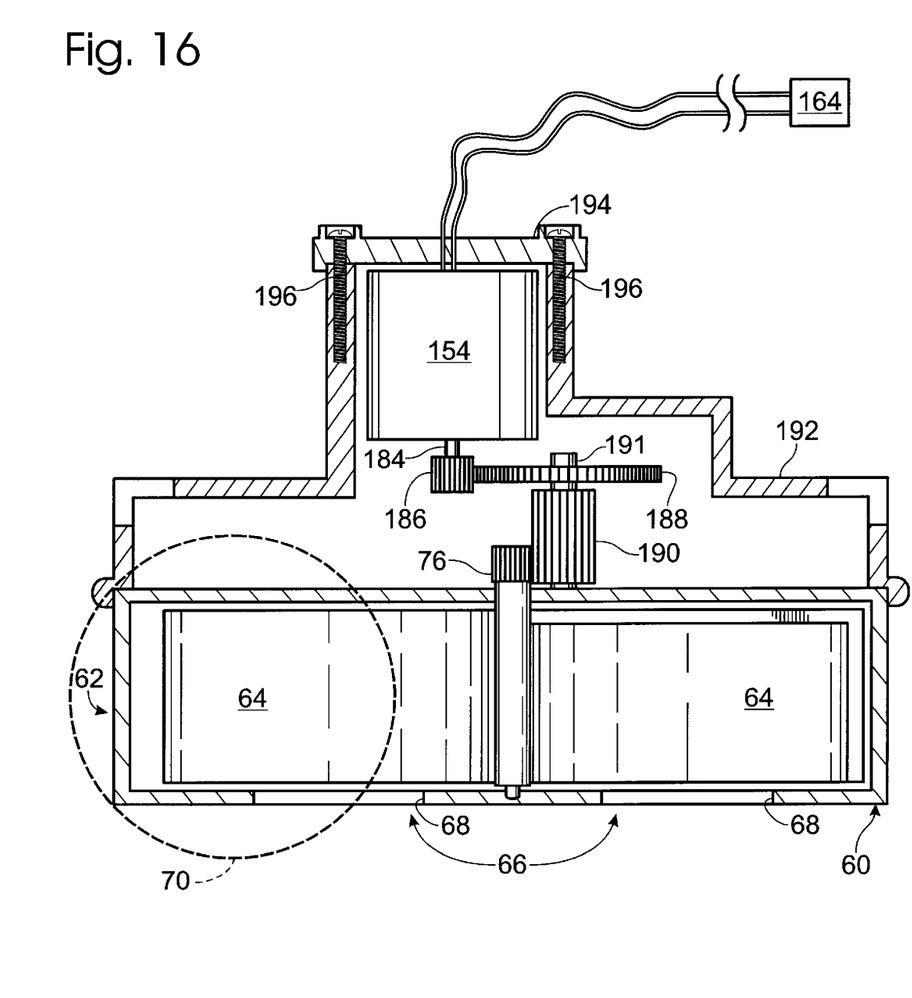
FIG. 16 is an enlarged cross-sectional detail showing a second motor assembly adapted to drive the bubble-producing mechanism of FIG. 5.

In FIG. 16, second motor assembly 154 is shown in communication with bubble mechanism 54. As shown, assembly 154 includes a motor 182 with an output shaft 184 having an output gear 186. Gear 186 is in driving communication with pinion 78 of fan assembly 56. In FIG. 16, a pair of gears 188 and 190 are shown interconnecting output gear 186 and pinion 78. Gears 188 and 190 are mounted on axle 191 and provide a selected amount of gear reduction between the speeds of rotation of gear 186 and pinion 78. It should be understood, however, that the number of interconnecting gears may vary from zero to three or more gears, depending on the particular gear reduction and direction of rotation desired. Similarly, the size of the gears and pinions may vary to control the gear reduction between the speed of rotation of output shaft 184 and the desired speed of rotation of fan assembly 56.

In FIG. 16, housing 60 of fan assembly 56 is shown including a cover 192 to which second motor assembly 154 is mounted. Also shown, is a removable end plate 194 that encloses motor assembly 154 within cover 192. Plate 194 may be releasably secured to cover 192 through any suitable mechanism, such as screws 196, snap locks, threads and the like.

Figure 17:
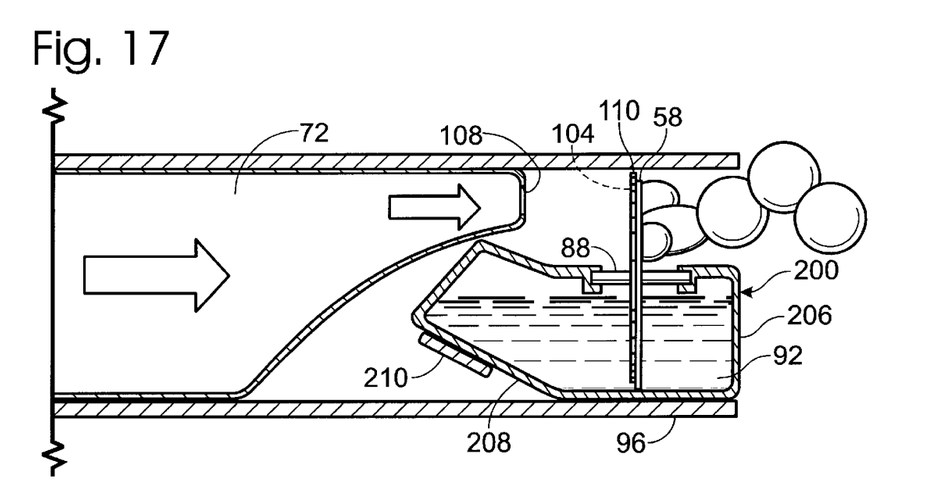
FIG. 17 is an enlarged cross-sectional detail showing the discharge portion of another version of the bubble-producing mechanism of FIG. 5.

Another embodiment of the discharge portion of bubble mechanism 54 is shown in FIG. 17. Similar to the previously discussed embodiment, air passage 72 terminates at an outlet 108 and includes a mount, or platform, 96 on which a bubble tray with a rotatable bubble wheel 58 is supported. In FIG. 17, the bubble tray is indicated at 200 and is adapted to hold a volume of bubble solution 92, which is added and removed from tray 200 through an opening 202. As shown, tray 200 includes a housing 206 that includes a portion 208 that is oriented to direct air from passage 72 to strike the vanes 110 and apertures 104 in bubble wheel 58. As shown, portion 208 extends at an angle upwardly from platform 96 and away from wheel 58. Also shown in FIG. 17 is a rib 210 that supports portion 208. Alternatively, a pair of ribs 210 may be used, one on each side of portion 208.

Figure 18:
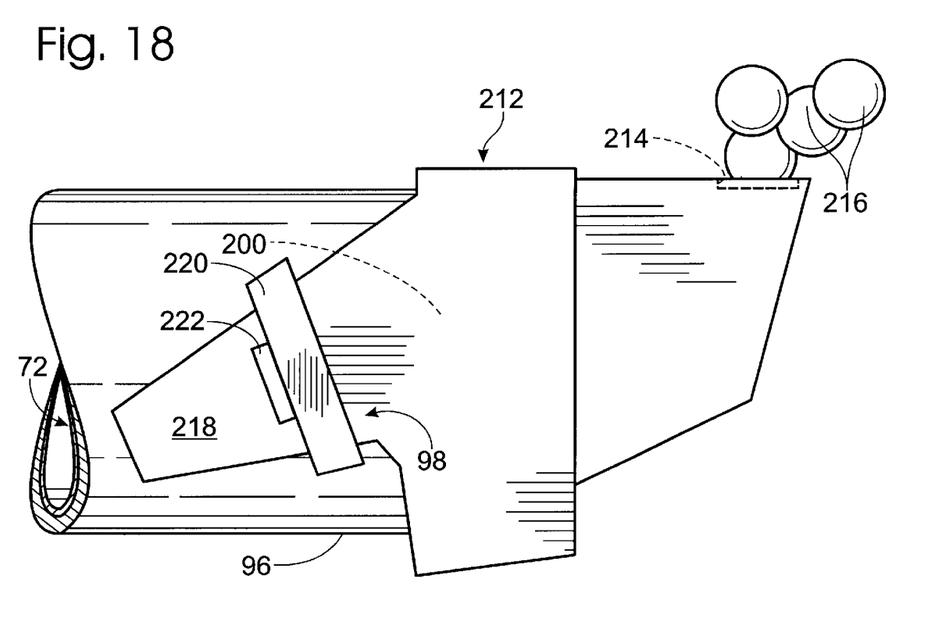
FIG. 18 is a fragmentary side elevation view of another version of the bubble-producing mechanism of FIG. 5 showing a retainer for preventing unintentional removal of the bubble tray.

Unintentional removal of bubble tray 200 is prevented by a retainer 98. In FIG. 18, an example of a suitable retainer 98 is shown in the form of a removable end portion 212 that attaches to platform 96. End portion 212 includes an aperture 214 through which bubbles 216 produced by bubble wheel 58 pass. Portion 212 further includes a pair of legs 218 that selectively engage is stirrups 220 on air passage 72. As shown, each leg 218 includes a foot, or projection, 222 that selectively engages a corresponding one of the stirrups 220 to prevent unintentional removal of end portion 212 or bubble tray 200. Legs 218 are deformable, or deflectable, toward platform 96 to free legs 218 from engagement with stirrups 220, thereby permitting the removal of end portion 212 from platform 96.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Where the claims recite "a" or "a first" element or the equivalent thereof, such claims should be understood to include incorporation of one or more such elements, neither requiring nor excluding two or more such elements.

The following claims recite certain combinations and subcombinations that are directed to one of the disclosed inventions and are believed to be novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A children's ride-on vehicle, comprising:
   a vehicle body having a seat;
   at least one steerable wheel rotatably coupled to the body;
   a drive assembly;
   at least one driven wheel coupled to the drive assembly and adapted to be rotatably driven thereby; and
   a bubble mechanism chargeable with a volume of bubble solution and adapted to produce bubbles therefrom, wherein the bubble mechanism includes a rotatable bubble wheel and an electrically-powered fan assembly adapted to deliver an airflow to the bubble wheel, and further wherein the bubble wheel is adapted to be rotationally driven by the airflow.

2. The vehicle of claim 1, wherein the drive assembly includes a battery-powered motor assembly including at least one motor adapted to selectively drive the at least one driven wheel.

3. The vehicle of claim 2, wherein the bubble mechanism includes at least one motor adapted to drive the fan assembly of the bubble mechanism.

4. The vehicle of claim 3, further including a battery adapted to power the at least one motor adapted to selectively drive the at least one driven wheel and the at least one motor adapted to drive the fan assembly of the bubble mechanism.

5. The vehicle of claim 3, further including a plurality of batteries, including at least one battery adapted to power the at least one motor adapted to selectively drive the at least one driven wheel, and at least one battery adapted to power the at least one motor adapted to drive the fan assembly of the bubble mechanism.

6. The vehicle of claim 5, wherein the at least one motor adapted to drive the fan assembly of the bubble mechanism is not adapted to drive the at least one driven wheel.

7. The vehicle of claim 1, wherein the bubble mechanism includes at least one motor adapted to drive the fan assembly of the bubble mechanism.

8. The vehicle of claim 5, wherein the bubble wheel includes a plurality of vanes adapted to cause rotation of the bubble wheel upon delivery of the airflow from the fan assembly.

9. The vehicle of claim 1, wherein the bubble mechanism further includes a bubble tray that is adapted to receive the volume of bubble solution.

10. The vehicle of claim 9, wherein the bubble mechanism includes a rotatable bubble wheel that extends at least partially within the bubble tray.

11. The vehicle of claim 9, wherein the bubble tray is adapted to be selectively removed from the vehicle, and further including a retainer adapted to prevent unintentional removal of the bubble tray from the vehicle.

12. The vehicle of claim 1, wherein the body includes an aperture adapted to receive a bubble wand, and further wherein the vehicle further includes a bubble wand adapted to be removably received at least partially within the aperture.

13. The vehicle of claim 12, wherein the aperture is elongate and further wherein a portion of the wand is received through the aperture, and the portion is laterally slidable within the aperture.

14. The vehicle of claim 13, wherein the bubble wand includes a handle portion shaped to resemble a shift lever.

15. A children's ride-on vehicle, comprising:
   vehicle body including a seat adapted to receive a child;
   a drive assembly including a battery assembly and a motor assembly in communication with the battery assembly;
   at least one steerable wheel coupled to a steering mechanism that is adapted to enable a user to steer the vehicle;
   at least one driven wheel in communication with the drive assembly and adapted to be rotatably driven by the drive assembly; and
   means for producing bubbles from a bubble solution, wherein the means for producing bubbles from a bubble solution includes a fan assembly that is adapted to produce an airflow and a rotatable bubble wheel that is rotationally driven by the airflow.

16. The vehicle of claim 15, wherein the body is in the form of a riding lawnmower and includes regions adapted to represent a seat, a cutting deck with foot boards, and an exhaust chute, and further wherein the cutting deck region houses at least a portion of the means for producing bubbles from a bubble solution.

17. The vehicle of claim 16, wherein the means for producing bubbles is adapted to discharge bubbles through the exhaust chute portion of the body.

18. The vehicle of claim 15, wherein the drive assembly includes a battery-powered motor assembly with at least one motor adapted to selectively drive the at least one driven wheel.

19. The vehicle of claim 15 wherein the body includes an aperture adapted to receive a bubble wand, and further wherein the vehicle further includes a bubble wand adapted to be removably received at least partially within the aperture.

20. The vehicle of claim 19, wherein the aperture is elongate and further wherein a portion of the wand is received through the aperture, and the portion is laterally slidable within the aperture.

21. The vehicle of claim 20, wherein the bubble wand includes a handle portion shaped to resemble a shift lever.

22. The vehicle of claim 15, wherein the body further includes an exhaust pipe region, and further wherein the exhaust pipe region is adapted to receive and support a container of bubble solution.

23. The vehicle of claim 15, wherein the means for producing bubbles is driven by at least one motor.

24. The vehicle of claim 15, wherein the means for producing bubbles is adapted to produce bubbles responsive to actuation of the drive assembly.

25. The vehicle of claim 15, wherein the means for producing bubbles is adapted to produce bubbles independent of the drive assembly.

26. A children's ride-on vehicle, comprising:
   a vehicle body having a seat and an aperture adapted to receive a bubble wand;
   a bubble wand adapted to be removably received at least partially within the aperture;
   at least one steerable wheel rotatably coupled to the body;
   a drive assembly;
   at least one driven wheel coupled to the drive assembly and adapted to be rotatably driven thereby; and
   a bubble mechanism chargeable with a volume of bubble solution and adapted to produce bubbles therefrom, wherein the bubble mechanism includes a rotatable bubble wheel and an electrically-powered fan assembly adapted to deliver an airflow to the bubble wheel.

27. The vehicle of claim 26, wherein the aperture is elongate and further wherein a portion of the wand is received through the aperture, and the portion is laterally slidable within the aperture.

28. The vehicle of claim 27, wherein the bubble wand includes a handle portion shaped to resemble a shift lever.

29. The vehicle of claim 26, wherein the body further includes an exhaust pipe region, and further wherein the exhaust pipe region is adapted to receive and support a container of bubble solution.

* * * * *